US007693642B2

(12) United States Patent
Anderson et al.

(10) Patent No.: US 7,693,642 B2
(45) Date of Patent: Apr. 6, 2010

(54) ANTI-OVERSPEED SYSTEM FOR VEHICLE AND ASSOCIATED METHOD

(75) Inventors: Eric R. Anderson, Galena, IL (US); Jahmy J. Hindman, Rickardsville, IA (US); Briton T. Eastman, Coffeyville, KS (US)

(73) Assignee: Deere & Company, Moline, IL (US)

( * ) Notice: Subject to any disclaimer, the term of this patent is extended or adjusted under 35 U.S.C. 154(b) by 741 days.

(21) Appl. No.: 11/544,384

(22) Filed: Oct. 6, 2006

(65) Prior Publication Data

US 2008/0086254 A1 Apr. 10, 2008

(51) Int. Cl.
*B60T 7/12* (2006.01)

(52) U.S. Cl. ............................ 701/93; 701/50; 701/84

(58) Field of Classification Search .................. 701/93, 701/50, 84; 172/1
See application file for complete search history.

(56) References Cited

U.S. PATENT DOCUMENTS 4,107,776 A * 8/1978 Beale ......................... 701/99
4,208,925 A * 6/1980 Miller et al. ................. 477/63
5,951,258 A * 9/1999 Lueschow et al. ............. 417/22
2007/0187167 A1 8/2007 Mariani et al.

* cited by examiner

*Primary Examiner*—Yonel Beaulieu

(57) ABSTRACT

An anti-overspeed system is adapted to prevent overspeeding of an engine of a vehicle. The anti-overspeed system has an anti-overspeed hydraulic circuit operably connected to the engine and a controller for controlling the hydraulic circuit in a manner that prevents overspeeding of the engine.

9 Claims, 4 Drawing Sheets

Requested Engine Speed Sensor
Actual Engine Speed Sensor
Controller
Anti-Overspeed Hydraulic Circuit
Drivetrain/Engine Load Path
Engine
Trans.
Driveline Including Final Drive 30
10 12 14 16 18 20 22 24 26 28 30 32 32 34 36 48 50

ANTI-OVERSPEED SYSTEM FOR VEHICLE AND ASSOCIATED METHOD

FIELD OF THE DISCLOSURE

The present disclosure relates to engine speed control and methods and apparatus associated therewith.

BACKGROUND OF THE DISCLOSURE

Typically, an engine of a vehicle experiences a resistive load from the drive wheel(s) or other final drive element(s) included in the drivetrain of the vehicle. However, there may be times when the load is no longer resistive but becomes an overrunning load, causing the engine, and components mounted thereto, to overspeed such that the actual engine speed exceeds the normal engine speed range for the particular engine speed requested by the operator. Such an overrunning load may result from, for example, deceleration or traveling with a grade and may significantly decrease the life of the engine and attached components.

SUMMARY OF THE DISCLOSURE

According to the present disclosure, there is provided a vehicle comprising an engine, a requested engine speed sensor, an actual engine speed sensor, an anti-overspeed hydraulic circuit operably connected to the engine, and a controller in communication with the requested engine speed sensor, the actual engine speed sensor, and the anti-overspeed hydraulic circuit.

The controller is adapted to: monitor output of the requested engine speed sensor for a requested engine speed signal representative of a requested engine speed for the engine and output of the actual engine speed sensor for an actual engine speed signal representative of an actual engine speed of the engine, determine from the requested engine speed signal and the actual engine speed signal if the actual engine speed exceeds the requested engine speed according to predetermined criteria, and if the actual engine speed exceeds the requested engine speed according to the predetermined criteria command operation of the anti-overspeed hydraulic circuit with at least one control signal to convert energy urging the actual engine speed to so exceed the requested engine speed into hydraulic energy so as to reduce the actual engine speed. In this way, overspeeding of the engine, and potential consequential damage to the engine and attached components, can be avoided.

In an illustrated embodiment, the anti-overspeed hydraulic circuit comprises a fixed-displacement hydraulic pump operably connected to the engine, an accumulator fluidly connected to the fixed-displacement hydraulic pump to receive hydraulic fluid therefrom, and a proportional pressure-relief valve fluidly connected to the fixed-displacement hydraulic pump and under the control of the controller. The controller is adapted to output a control signal to the proportional pressure-relief valve increasing a pressure-relief setting of the proportional pressure-relief valve so as to direct hydraulic fluid from the fixed-displacement hydraulic pump to the accumulator.

In another illustrated embodiment, the anti-overspeed hydraulic circuit comprises a variable-displacement hydraulic pump and an accumulator fluidly connected to the variable-displacement hydraulic pump. The variable-displacement hydraulic pump is operably connected to the engine and under the control of the controller. The controller is adapted to output a control signal to the variable-displacement hydraulic pump increasing a displacement setting of the variable-displacement hydraulic pump so as to direct hydraulic fluid from the variable-displacement hydraulic pump to the accumulator.

In both embodiments, a valve may be operated with a control signal from the controller to direct a supplemental flow of hydraulic fluid from the accumulator to an implement hydraulic circuit for operating an implement of the vehicle.

An associated method is disclosed. In general, the method comprises monitoring a requested engine speed signal representative of a requested engine speed for an engine and an actual engine speed signal representative of an actual engine speed of the engine, determining from the requested engine speed signal and the actual engine speed signal if the actual engine speed exceeds the requested engine speed according to predetermined criteria, and if the actual engine speed exceeds the requested engine speed according to the predetermined criteria, commanding operation of an anti-overspeed hydraulic circuit operably connected to the engine with at least one control signal to convert energy urging the actual engine speed to so exceed the requested engine speed into hydraulic energy so as to reduce the actual engine speed.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
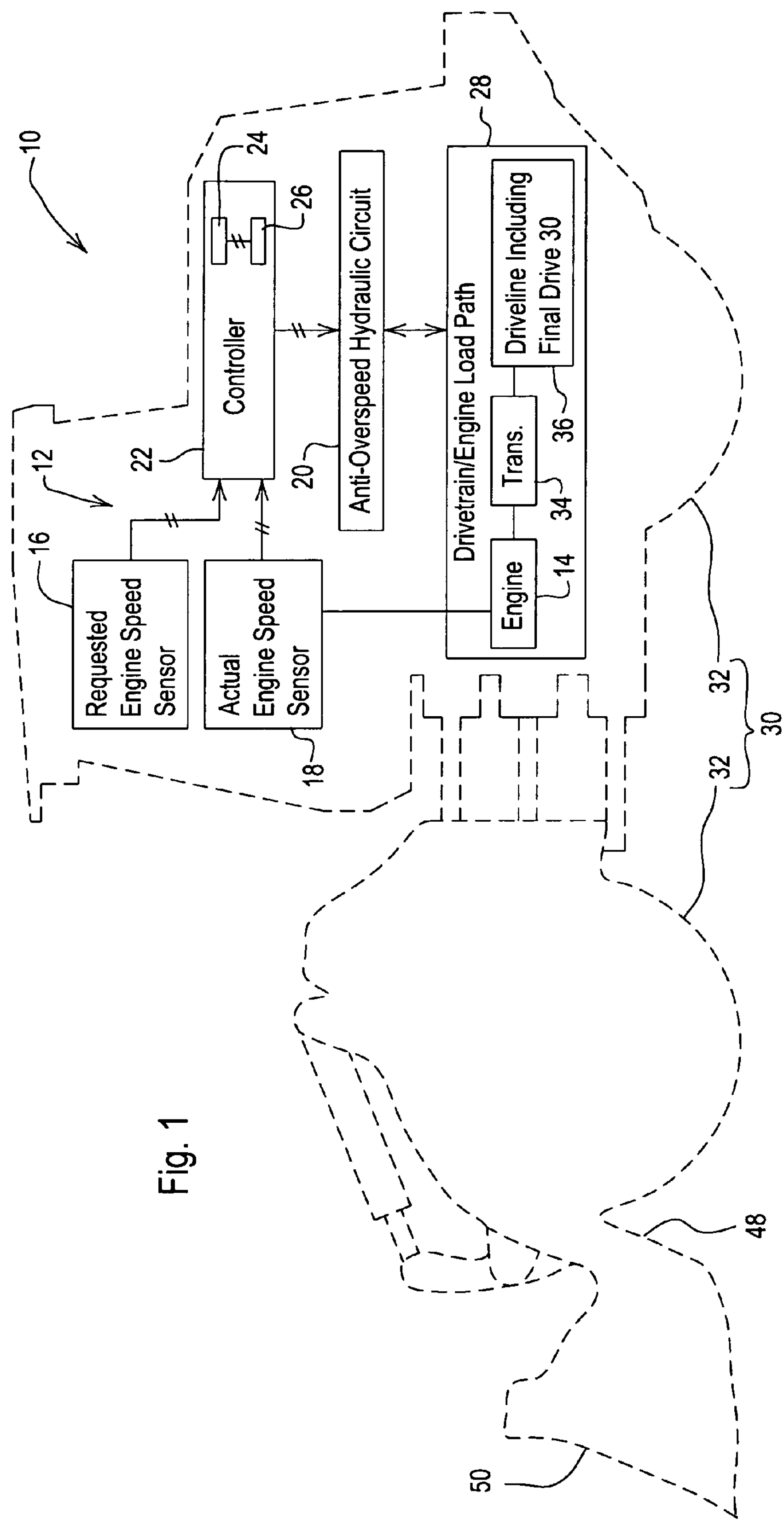
FIG. 1 is a diagrammatic view of a vehicle with an anti-overspeed system for preventing overspeeding of an engine of the vehicle.

Referring to FIG. 1, there is shown a vehicle 10 with an anti-overspeed system 12 for preventing overspeeding of the vehicle 10. The vehicle 10 may be configured as a work vehicle in the form of, for example, a four-wheel drive loader (illustrated) or other type of work vehicle.

The anti-overspeed system 12 includes an engine 14, a requested engine speed sensor 16 (e.g., throttle position sensor), an actual engine speed sensor 18 (e.g., crankshaft rotation speed sensor), an anti-overspeed hydraulic circuit 20 operably connected to the engine 14, and a controller 22 in communication with the requested engine speed sensor 16, the actual engine speed sensor 18, and the anti-overspeed hydraulic circuit 20. The controller 22 is adapted to: monitor output of the requested engine speed sensor 16 for a requested engine speed signal representative of a requested engine speed for the engine 14 and output of the actual engine speed sensor 18 for an actual engine speed signal representative of an actual engine speed of the engine 14, determine from the requested engine speed signal and the actual engine speed signal if the actual engine speed exceeds the requested engine speed according to predetermined criteria, and, if the actual engine speed exceeds the requested engine speed according to the predetermined criteria, command operation of the anti-overspeed hydraulic circuit 20 with at least one control signal to convert energy urging the actual engine speed to so exceed the requested engine speed (i.e., overspeed-urging energy) into hydraulic energy so as to reduce the actual engine speed. In this way, overspeeding of the engine 14 is prevented.

The controller 22 is configured, for example, as an electronic controller. As such, the controller comprises a processor 24 and a memory 26, the memory 26 having stored therein instructions which, when executed by the processor 24, cause the processor to: monitor the requested engine speed signal representative of the requested engine speed for the engine 14 and an actual engine speed signal representative of an actual engine speed of the engine 14, determine from the requested engine speed signal and the actual engine speed signal if the actual engine speed exceeds the requested engine speed according to predetermined criteria, and, if the actual engine speed exceeds the requested engine speed according to the predetermined criteria, command operation of the anti-overspeed hydraulic circuit 20 operably connected to the engine 14 with at least one control signal to convert energy urging the actual engine speed to so exceed the requested engine speed into hydraulic energy so as to reduce the actual engine speed. It is to be understood that such an electronic controller may include only one electronic controller or include a system of electronic controllers interconnected by a communication bus such as a controller area network (CAN) bus.

Exemplarily, the predetermined criteria is a test whether the actual engine speed exceeds a predetermined threshold engine speed greater than and corresponding to the requested engine speed. If the actual engine speed exceeds the predetermined threshold engine speed, the controller 22 will command operation of the circuit 20 to reduce the actual engine speed to a desired engine speed less than the predetermined threshold engine speed. For example, for a requested engine speed of 1800 rpm (i.e., revolutions per minute), the predetermined threshold engine speed may be 1900 rpm and stored in the controller as such. If the controller 22 determines that the actual engine speed exceeds 1900 rpm, it will command operation of the circuit 20 so as to reduce the actual engine speed to the desired engine speed less than 1900 rpm.

The predetermined threshold engine speed corresponds to the requested engine speed such that there may be different threshold engine speeds for different requested engine speeds. Various threshold engine speeds corresponding to respective requested engine speeds may be stored in the memory 26 by virtue of a look-up table, map, equation, or the like.

The anti-overspeed hydraulic circuit 20 may be operably connected to the engine 14 in a variety of ways. For example, it may be operably connected to the engine 14 directly or indirectly. Stated otherwise, it may be operably connected to an engine load path 28 (or any part thereof) extending from, and including, a final drive 30 (e.g., the drive wheels 32) to, and including, the engine 14, the engine load path 28 being configured to transfer an overrunning load capable of urging overspeeding of the engine 14 from the final drive 30 to the engine 14. Being connected to the engine load path 28, the anti-overspeed circuit 20 is able to “drain” energy of the overrunning load present in the engine load path 28 away from the engine 14 and to convert this energy into hydraulic energy such as potential hydraulic energy.

The engine load path 28 is, for example, the drivetrain of the vehicle 10. The circuit 20 may thus be connected to one or more components of the drivetrain 28 such as, for example, the transmission 34 (e.g., infinitely variable transmission such as hydro-mechanical infinitely variable transmission, direct drive, torque converter power shift with or without lock-up, or electric drive) or the driveline 36 including, for example, a driveshaft, differential, axle(s), and/or the final drive 30 (e.g., one of the four wheels 32).

Figure 2:
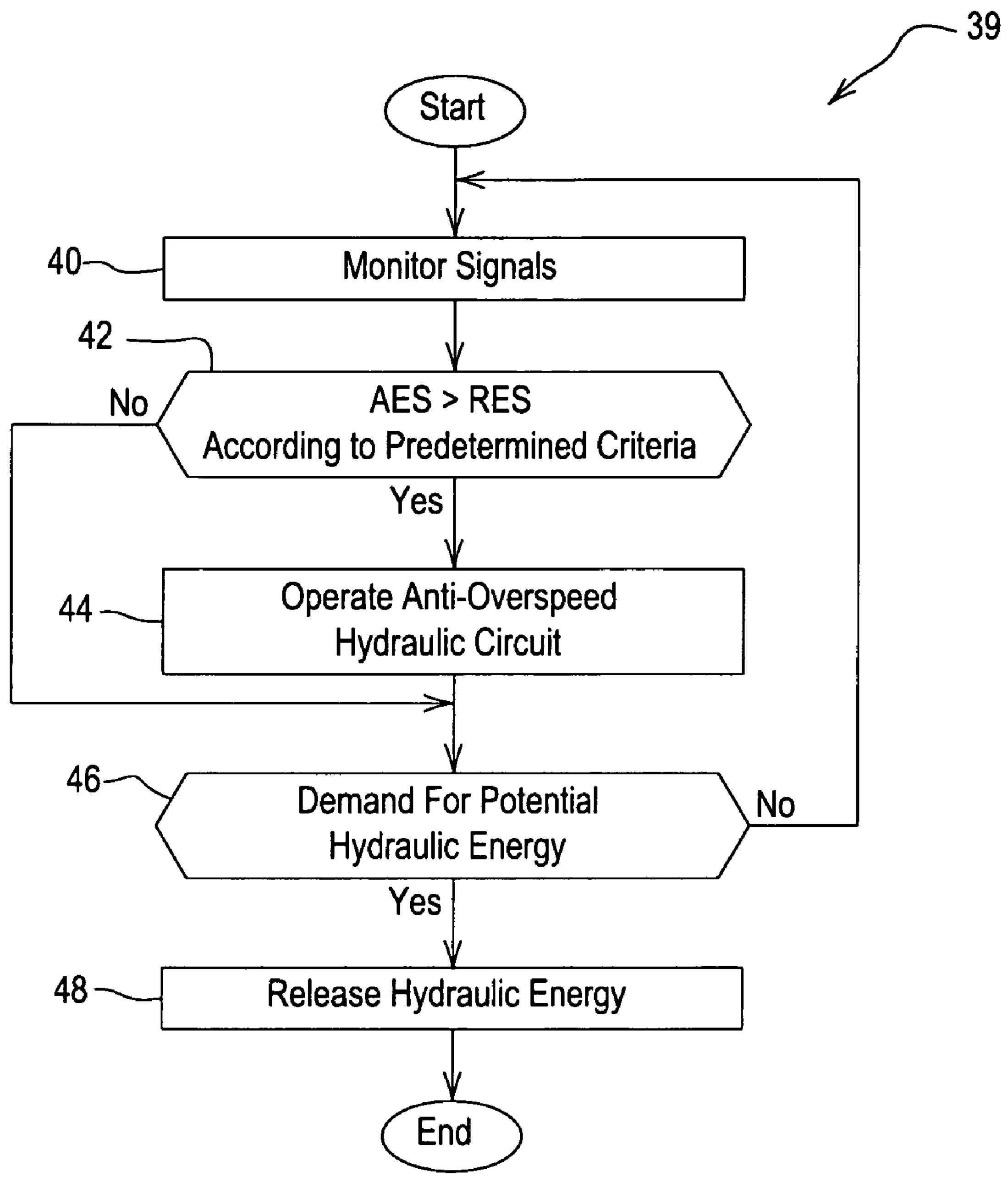
FIG. 2 is a view of a control routine to be performed by a controller of the anti-overspeed system.

Referring to FIG. 2, there is shown a control routine 39 of the controller 22. In act 40 of the control routine 39, the controller 22 monitors output of the requested engine speed sensor 16 for the requested engine speed signal and the actual engine speed sensor 18 for the actual engine speed signal.

In act 42, the controller 22 determines from the requested engine speed signal and the actual engine speed signal if the actual engine speed (“AES” in the drawings) exceeds the requested engine speed (“RES” in the drawings) according to the predetermined criteria (e.g., if the actual engine speed exceeds the threshold engine speed). If no, the control routine 39 advances to act 46 discussed below. If yes, the control routine 39 advances to act 44.

In act 44, the controller 22 commands operation of the anti-overspeed hydraulic circuit 20 with at least one control signal to convert energy urging the actual engine speed to so exceed the requested engine speed into hydraulic energy so as to reduce the actual engine speed to the desired engine speed. The desired engine speed may be, for example, between the threshold engine speed and the requested engine speed.

The hydraulic energy may be stored as potential hydraulic energy. As such, in act 46, the controller 22 determines whether there is a demand for the potential hydraulic energy. The demand may be, for example, a demand to supplement engine torque (FIG. 3), a demand for hydraulic fluid to assist with operating an implement (e.g., raising a boom 48 having a loaded or unloaded bucket 50 connected thereto) (FIGS. 3 and 4), or a demand for hydraulic fluid to assist with vehicle acceleration, to name just a few possible demands for hydraulic energy. If there is no current demand, the control routine 39 returns to act 40. If the controller 22 receives a demand signal representing that there is a demand, the control routine 39 advances to act 48 in which the controller 22 outputs a control signal to the circuit 20 commanding release of the stored hydraulic energy to the demanding function.

If the engine 14 is not being urged to overspeed (e.g., the actual engine speed is less than the threshold engine speed) and there is no need for the stored hydraulic energy, the controller 22 operates the circuit 20 in a manner so as to minimize parasitic losses that may be caused thereby in the drivetrain 28.

By way of example, the anti-overspeed system 12 may be particularly useful with a work vehicle such as a four-wheel drive loader operating between a pile of material and a truck or other type of material receiver. After the loader has collected material from the pile in its bucket 50, the loader may back away from the pile in reverse. During deceleration just before it stops in order to go forward toward the truck, the engine 14 may be prone to overspeed, in which case, if the actual engine speed exceeds the requested engine speed according to the predetermined criteria (e.g., the actual engine speed exceeds the threshold engine speed greater than and corresponding to the requested engine speed), the controller 22 activates the anti-overspeed hydraulic circuit 20 to convert the overspeed-urging energy into hydraulic energy so as to reduce the actual engine speed to, for example, the desired engine speed. The hydraulic energy may be stored in the circuit 20 as potential hydraulic energy, in which case, upon forward advancement of the loader toward the truck, the potential hydraulic energy may be added back to the drivetrain 28 supplementing engine torque to the drive wheels 32.

Overspeed-urging energy may again be stored in the anti-overspeed hydraulic circuit 20 upon deceleration upon arrival at the truck, such stored potential hydraulic energy being useful to supplement engine torque initially upon reversal away from the truck. This cycle of storing and releasing hydraulic energy may be repeated as the loader decelerates in reverse to a stop as the loader backs away from the truck, and then advances again in forward to return to the pile. At any time that the boom 48 is raised in this sequence, any stored hydraulic energy in the circuit 20 may be added to the implement hydraulic circuit responsible for raising the boom 48 and bucket 50 attached thereto.

Two implementations of the anti-overspeed hydraulic circuit 20 are discussed next in connection with FIGS. 3 and 4, respectively.

Figure 3:
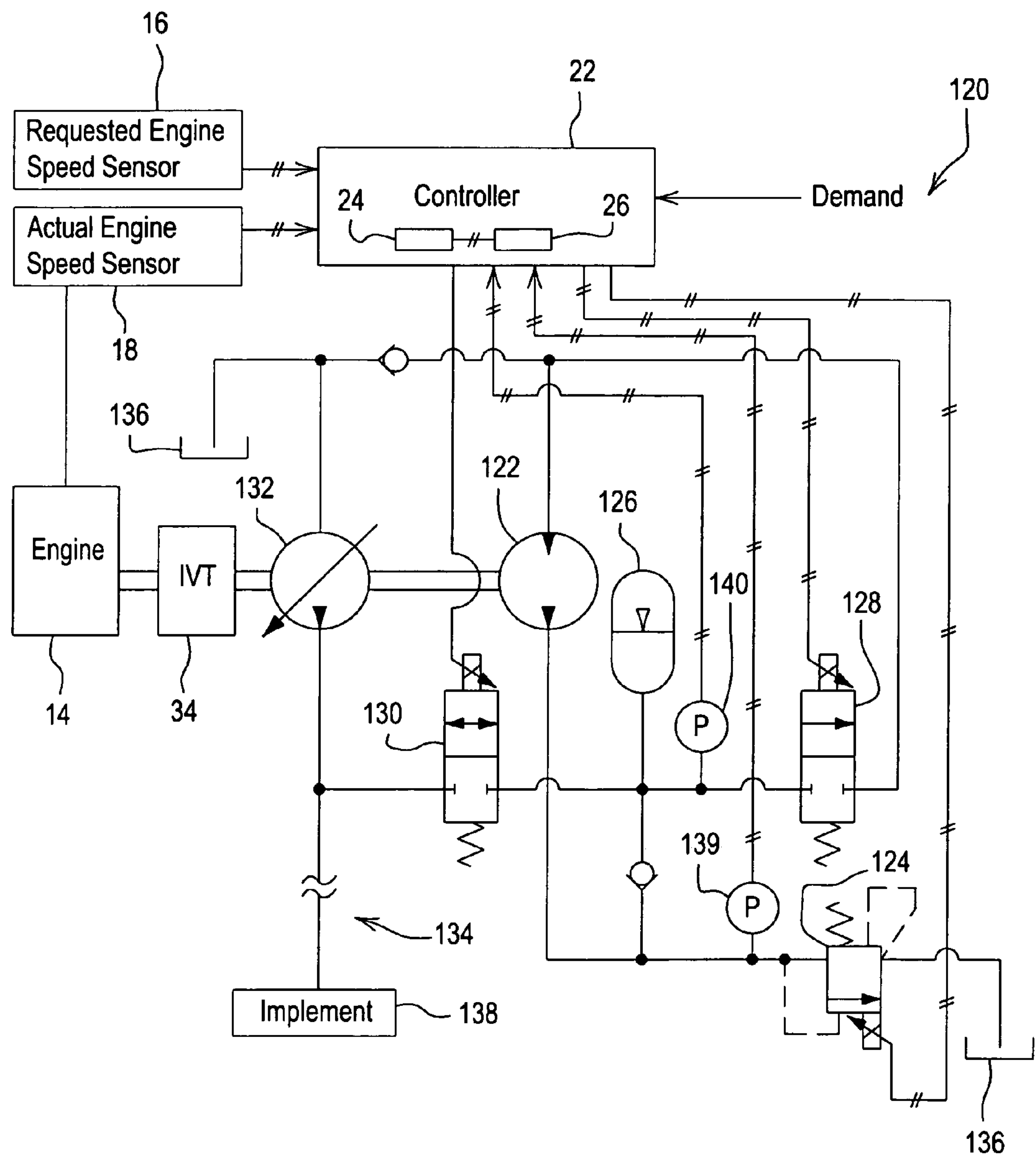
FIG. 3 is a diagrammatic view showing an embodiment of an anti-overspeed hydraulic circuit for use in the anti-overspeed system.

Referring to FIG. 3, there is shown an anti-overspeed hydraulic circuit 120 which may be used as the anti-overspeed hydraulic circuit 20 of the anti-overspeed system 12 and operated according to the control routine 39 with associated additions thereto.

The anti-overspeed hydraulic circuit 120 includes a fixed-displacement hydraulic pump 122, a proportional pressure-relief valve 124 with a variable pressure-relief setting (e.g., 0-3600 psi) and electrically connected to and under the control of the controller 22, an accumulator 126, a proportional first flow-control valve 128 electrically connected to and under the control of the controller 22, a proportional second flow-control valve 130 electrically connected to and under the control of the controller 22, and pressure sensors 139, 140 electrically connected to the controller 22 to input pressure readings thereto. Exemplarily, the pump 122 is operably connected to the engine 14 via an implement variable-displacement hydraulic pump 132 of an implement hydraulic circuit 134 and the transmission 34 of the engine load path 28. The transmission 34 is configured, for example, as an infinitely variable transmission ("IVT").

Referring to FIGS. 2 and 3, the control routine 39 is applicable to the circuit 120. In act 40, the controller 22 monitors output of the requested engine speed sensor 16 for the requested engine speed signal and the actual engine speed sensor 18 for the actual engine speed signal. Meanwhile, the first and second flow-control valves 128 and 130 remain biased to their normal no-flow positions while the pressure-relief valve 124 remains biased to its normal maximum-flow position with a minimum pressure setting (e.g., 0 psi) such that the pump 122 is operated by the engine 14 via the IVT 34 and the pump 132 to circulate hydraulic fluid from a hydraulic reservoir 136 across the pressure-relief valve 124 back to the reservoir 136.

In act 42, the controller 22 determines from the requested engine speed signal and the actual engine speed signal if the actual engine speed ("AES" in the drawings) exceeds the requested engine speed ("RES" in the drawings) according to the predetermined criteria (e.g., if the actual engine speed exceeds the threshold engine speed). If no, the control routine 39 advances to act 46. If yes, the control routine 39 advances to act 44.

In act 44, the controller 22 commands operation of the anti-overspeed hydraulic circuit 120 to convert overspeed-urging energy into hydraulic energy so as to reduce the actual engine speed to the desired engine speed. In particular, while the valves 128 and 130 remain in their no-flow positions, the controller 22 outputs a control signal to the pressure-relief valve 124 increasing the pressure-relief setting of the valve 124 (e.g., 3600 psi) so as to direct hydraulic fluid pumped by the pump 122 to the accumulator 126 for storage therein. Afterwards, the control routine 39 advances to act 46.

In act 46, the controller 22 determines whether there is a demand for the potential hydraulic energy stored in the accumulator 126. The demand may be, for example, a demand to supplement engine torque or a demand for assistance with operating an implement 138. Both demands can be accommodated by the circuit 120. If there is no such demand as determined from a demand signal, the control routine 39 returns to act 40.

If there is such a demand, the control routine 39 advances to act 48 to release the hydraulic energy stored in the accumulator 126, the specific response of the controller 22 depending on the type of demand. In particular, if the demand is for supplemental engine torque, the controller 22 outputs a control signal to the pressure-relief valve 124 decreasing its pressure-relief setting (e.g., to its minimum pressure-relief setting such as, for example, 0 psi) and outputs a control signal to the valve 128 moving the valve 128 to a flow-enabling position (e.g., partial flow, full flow) while the valve 130 remains biased to its no-flow position. Hydraulic fluid stored in the accumulator 126 is thus directed from the accumulator 126 through the valve 128 back to the fixed-displacement hydraulic pump so as to operate the pump 122 as a motor to supplement engine torque, increasing the overall torque output at the final drive element(s). The demand for supplemental engine torque may be determined, for example, from the fuel flow rate to the engine 14.

If the demand is for assistance to the implement hydraulic circuit 134, the controller 22 outputs a control signal to the valve 130 moving the valve 130 to a flow-enabling position (e.g., partial flow, full flow) and outputs a control signal to the pressure-relief valve 124 decreasing its pressure-relief setting (e.g., to its minimum pressure-relief setting such as, for example, 0 psi) while the valve 128 remains biased to its no-flow position. Hydraulic fluid stored in the accumulator 126 is thus directed from the accumulator 126 through the valve 130 to the implement hydraulic circuit 134 for use in controlling operation of the implement 138 (e.g., raising a boom), thereby supplementing the circuit 134 with hydraulic fluid.

If the engine 14 is not being urged to overspeed (e.g., the actual engine speed is less than the threshold engine speed) and there is no need for the stored hydraulic energy, the controller 22 operates the circuit 120 in a manner so as to minimize parasitic losses that may be caused thereby in the drivetrain 28. In particular, the controller 22 decreases the pressure-relief setting of the pressure-relief valve 124 to its minimum pressure relief setting (e.g., 0 psi) and allows the valves 128 and 130 to assume their no-flow positions.

It is within the scope of this disclosure to use the pump 122 to assist in implement function even after the potential hydraulic energy stored in the circuit 120 has been released. In particular, in such a situation, the controller 22 may increase the pressure-relief setting of the valve 124 and move the valve 130 to a flow-enabling position (e.g., partial flow, full flow) while the valve 128 remains biased to its no-flow position such that the pump 122 pumps hydraulic fluid from the reservoir 136 through the valve 130 into the implement circuit 134 for use in control of operation of the implement 138. Exemplarily, the controller 22 may become aware of such a situation when the pressure at the accumulator 126 decreases to a predetermined accumulator pressure as measured by, for example, an accumulator pressure sensor (not shown) that is associated with the accumulator 126 and inputs accumulator pressure readings to the controller 22.

Figure 4:
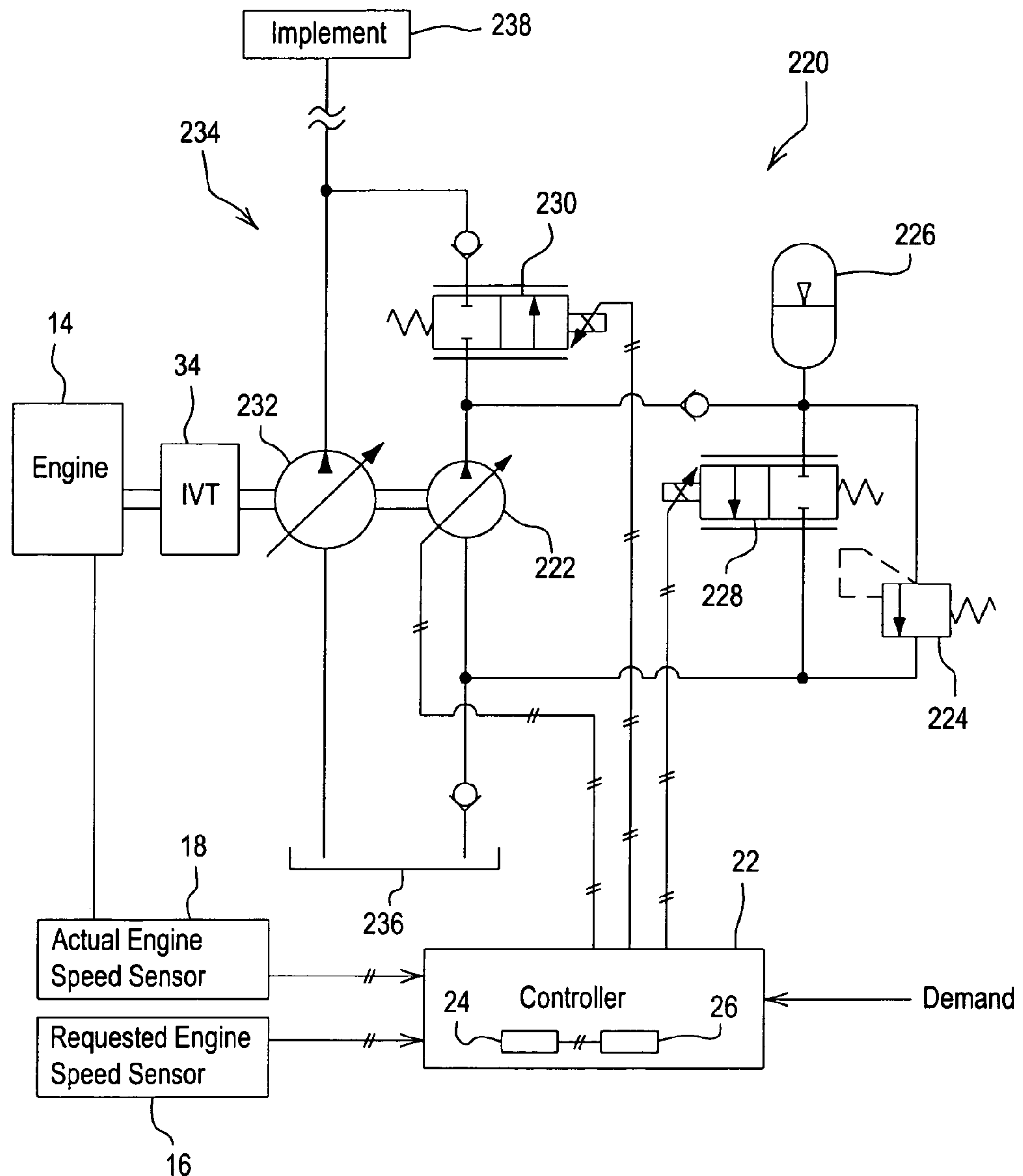
FIG. 4 is a diagrammatic view showing another embodiment of an anti-overspeed hydraulic circuit for use in the anti-overspeed system.

Referring to FIG. 4, there is shown an anti-overspeed hydraulic circuit 220 which may be used as the anti-overspeed hydraulic circuit 20 of the anti-overspeed system 12 and operated according to the control routine 39 with associated additions thereto.

The anti-overspeed hydraulic circuit 220 includes a variable-displacement hydraulic pump 222, a pressure-relief valve 224, an accumulator 226, a proportional first flow-control valve 228 electrically connected to and under the control of the controller 22, and a proportional second flow-control valve 230 electrically connected to and under the control of the controller 22. Exemplarily, the pump 222 is operably connected to the engine 14 via an implement variable-displacement hydraulic pump 232 of an implement hydraulic circuit 234 and the transmission 34 of the engine load path 28. The transmission 34 is configured, for example, as an infinitely variable transmission ("IVT").

Referring to FIGS. 2 and 4, the control routine 39 is applicable to the circuit 220. In act 40, the controller 22 monitors output of the requested engine speed sensor 16 for the requested engine speed signal and the actual engine speed sensor 18 for the actual engine speed signal. Meanwhile, the pump 222 assumes a no-flow displacement setting (e.g., in response to a control signal from controller 22) while the first and second flow-control valves 228 and 120 remain biased to their normal no-flow positions.

In act 42, the controller 22 determines from the requested engine speed signal and the actual engine speed signal if the actual engine speed ("AES" in the drawings) exceeds the requested engine speed ("RES" in the drawings) according to the predetermined criteria (e.g., if the actual engine speed exceeds the threshold engine speed). If no, the control routine 39 advances to act 46. If yes, the control routine 39 advances to act 44.

In act 44, the controller 22 commands operation of the anti-overspeed hydraulic circuit 120 to convert overspeed-urging energy into hydraulic energy so as to reduce the actual engine speed to the desired engine speed. In particular, while the valves 228 and 230 remain in their no-flow positions, the controller 22 outputs a control signal to the pump 222 increasing the displacement setting of the pump 222 so as to direct hydraulic fluid supplied by a hydraulic reservoir 236 from the pump 222 to the accumulator 226 for storage therein. If, after filling the accumulator 226, the engine 14 is still overspeeding, the pump 222 will cycle hydraulic fluid across the pressure-relief valve 224 such that hydraulic energy converted from the overspeed-urging energy is itself converted into heat heating the hydraulic fluid. Afterwards, the control routine 39 advances to act 46.

In act 46, the controller 22 determines whether there is a demand for the potential hydraulic energy stored in the accumulator 226. In particular, the controller 22 determines whether there is a demand for assistance with operating an implement 238 (e.g., raising a boom). If there is no such demand as determined from a demand signal, the control routine 39 returns to act 40.

If there is such a demand, the control routine 39 advances to act 48 to release the hydraulic energy stored in the accumulator 226. In particular, the controller 22 outputs a control signal to each of the valves 228, 230 moving each valve 228, 230 to a flow-enabling position (e.g., partial flow, full flow) directing supplement flow of hydraulic fluid from the accumulator 226 through the valve 228, the pump 222, and the valve 230 to the implement hydraulic circuit 234 for use in controlling operation of the implement 238, thereby supplementing the circuit 234 with hydraulic fluid.

If the engine 14 is not being urged to overspeed (e.g., the actual engine speed is less than the threshold engine speed) and there is no need for the stored hydraulic energy, the controller 22 operates the circuit 220 in a manner so as to minimize parasitic losses that may be caused thereby in the drivetrain 28. In particular, the controller 22 decreases the displacement setting of the pump 222 to its minimum displacement setting and allows the valves 228 and 230 to assume their no-flow positions.

It is within the scope of this disclosure to use the pump 222 to assist in implement function even after the potential hydraulic energy stored in the circuit 220 has been released. In particular, in such a situation, the controller 22 may increase the displacement setting of the pump 222 and move the valve 230 to a flow-enabling position (e.g., partial flow, full flow) while the valve 228 remains biased to its no-flow position such that the pump 222 pumps hydraulic fluid from the reservoir 236 through the valve 230 into the implement circuit 234 for use in control of operation of the implement 238. Exemplarily, the controller 22 may become aware of such a situation when the pressure at the accumulator 226 decreases to a predetermined accumulator pressure as measured by, for example, an accumulator pressure sensor (not shown) that is associated with the accumulator 226 and inputs accumulator pressure readings to the controller 22.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method, comprising:

monitoring a requested engine speed signal representative of a requested engine speed for an engine and an actual engine speed signal representative of an actual engine speed of the engine, determining from the requested engine speed signal and the actual engine speed signal if the actual engine speed exceeds the requested engine speed according to predetermined criteria, and if the actual engine speed exceeds the requested engine speed according to the predetermined criteria, commanding operation of an anti-overspeed hydraulic circuit operably connected to the engine with at least one control signal to convert energy urging the actual engine speed to so exceed the requested engine speed into hydraulic energy so as to reduce the actual engine speed.

2. The method of claim 1, wherein the determining comprises determining if the actual engine speed exceeds a predetermined threshold engine speed greater than and corresponding to the requested engine speed.

3. The method of claim 1, wherein the commanding comprises pumping hydraulic fluid into an accumulator with energy urging the actual engine speed to exceed the requested engine speed according to the predetermined criteria in response to a control signal.

4. The method of claim 3, comprising supplementing an implement hydraulic circuit with hydraulic fluid from the accumulator by outputting a control signal to a valve so as to direct hydraulic fluid from the accumulator to the implement hydraulic circuit.

5. The method of claim 3, wherein the pumping comprises operating a hydraulic pump connected to the engine via an infinitely variable transmission.

6. The method of claim 1, wherein the commanding comprises outputting a control signal to a proportional pressure-relief valve increasing a pressure-relief setting of the proportional pressure-relief valve so as to direct hydraulic fluid pumped by a fixed-displacement hydraulic pump operably connected to the engine to an accumulator.

7. The method of claim 6, comprising outputting a control signal to a valve directing hydraulic fluid from the accumulator back to the fixed-displacement hydraulic pump so as to operate the fixed-displacement hydraulic pump as a motor to supplement engine torque.

8. The method of claim 1, wherein the commanding comprises outputting a control signal to a variable-displacement hydraulic pump operably connected to the engine increasing a displacement setting of the variable-displacement hydraulic pump so as to pump hydraulic fluid from the variable-displacement hydraulic pump to an accumulator.

9. A controller comprising a processor and a memory, the memory having stored therein instructions which, when executed by the processor, cause the processor to:

monitor a requested engine speed signal representative of a requested engine speed for an engine and an actual engine speed signal representative of an actual engine speed of the engine, determine from the requested engine speed signal and the actual engine speed signal if the actual engine speed exceeds the requested engine speed according to predetermined criteria, and if the actual engine speed exceeds the requested engine speed according to the predetermined criteria, command operation of an anti-overspeed hydraulic circuit operably connected to the engine with at least one control signal to convert energy urging the actual engine speed to so exceed the requested engine speed into hydraulic energy so as to reduce the actual engine speed.

* * * * *